ns Patent [19]
Keller et al.

[11] 3,967,944
[45] July 6, 1976

[54] MILLICANE GLASS AND A METHOD FOR ITS PRODUCTION

[76] Inventors: Helen Keller; Raymond J. Keller, both of c/o Springville School, Springville, Pa. 18844

[22] Filed: Sept. 3, 1974

[21] Appl. No.: 502,386

[52] U.S. Cl. .................................... 65/36; 65/42; 65/44; 65/57; 65/DIG. 7
[51] Int. Cl.² ...................................... C03G 23/20
[58] Field of Search .............. 65/36, DIG. 7, 36, 79, 65/44, 42, 57, 76

[56] References Cited
UNITED STATES PATENTS

| | | | |
|---|---|---|---|
| 1,899,146 | 2/1933 | Gross | 65/DIG. 7 |
| 1,926,552 | 9/1933 | Morgan | 65/DIG. 7 |
| 2,037,853 | 4/1936 | Danner | 65/36 X |
| 3,554,721 | 1/1971 | Gardner | 65/DIG. 7 |

OTHER PUBLICATIONS

Glass, by Alexander Nesbitt, F.S.A., Chapman and Hall, (1878), Piccadilly, pp. 85–89.

*Primary Examiner*—S. Leon Bashore
*Assistant Examiner*—Frank W. Miga
*Attorney, Agent, or Firm*—Henry J. Walsh

[57] ABSTRACT

Disclosed is a method particularly suited to lampworking for producing unique surface effects on glass. In addition interlocking glass sections formed from bundles of rods preassembled on a cyclindrical core are disclosed.

10 Claims, 6 Drawing Figures

U.S. Patent July 6, 1976 3,967,944
FIG. 1
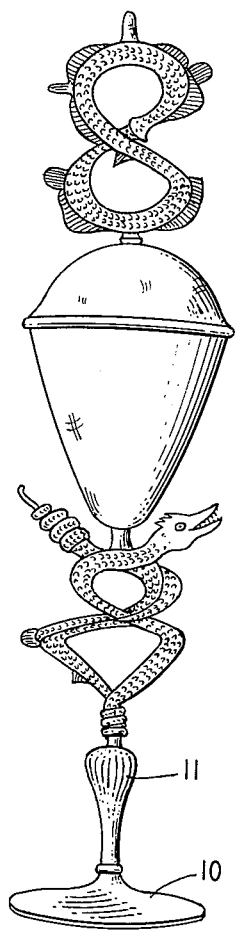
FIG. 2
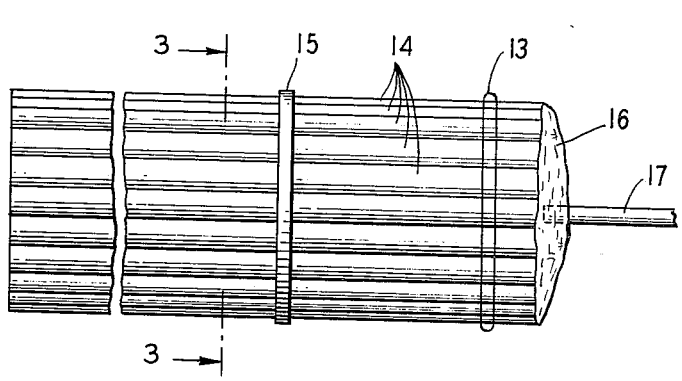
FIG. 4 DIRECTION OF LAMP WORK
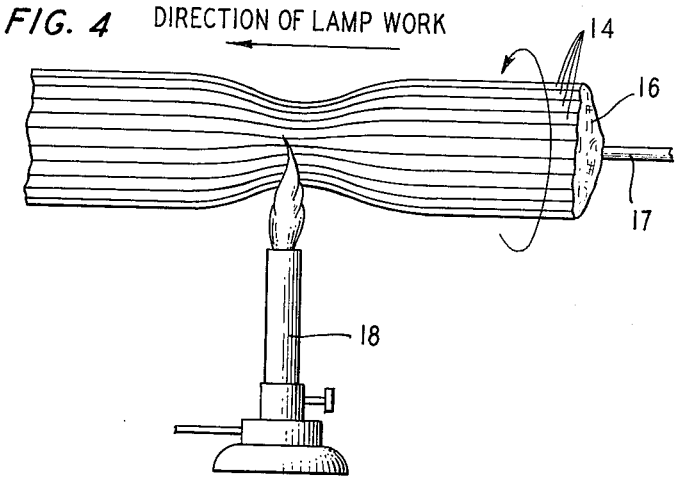
FIG. 3
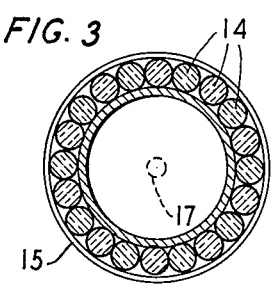
FIG. 5
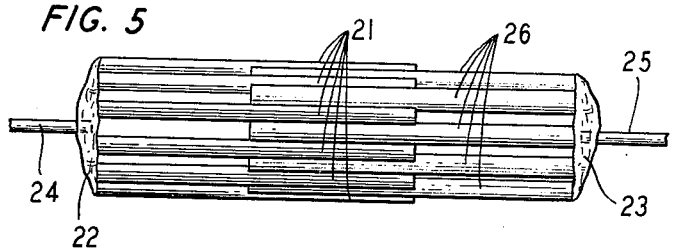
FIG. 6
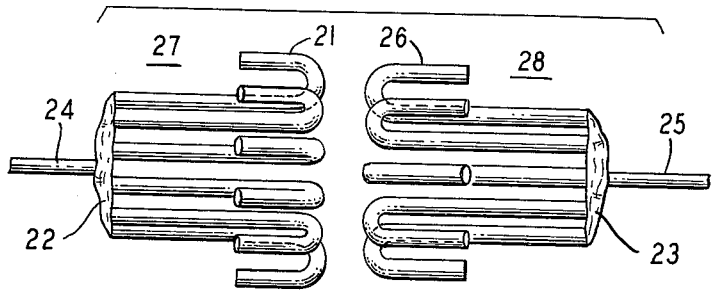

MILLICANE GLASS AND A METHOD FOR ITS PRODUCTION

BACKGROUND OF THE INVENTION

This invention relates to glassmaking and in particular to a method for creating unique raised rib-like surface patterns in glass ware finished by hand. In addition it is directed to the products produced by this unique method.

The art of hand crafting glass has no precise origin but it is generally recognized to have reached its technical zenith during the 16th century in Venice. The Venetian glass-makers, by hand crafting procedures, produced crackled glass (through quick reduction in temperature), gilded and enameled glass objects, marble opaque glass, and diamond engraved glass. Today, modern technology is employed to mass produce the glass vessels used commercially. Dishes, fuse plugs and TV face plates are forged from gobs of hot glass which are fed into molds, stamped into shape, and cooled. But, complex laboratory and scientific ware is still finished by hand. The "lampworker", as such nad craftsman are known, working over an open-flame burner or "lamp" with glass tubing or rod fashions many special scientific tools as well as glass objects of art.

The known ways in which the hand craftsman creates surface designs in glass are relatively limited. Crackling effects as stated previously, can be achieved by controlled cooling. Another way is the difficult and laborious art of copper wheel engraving. Here the engraver works at a lathe into which he fits, one at a time, scores of copper wheels of various thickness. The glass, coated with oil and emery powder is pressed against the wheels resulting in shallow intaglio. Yet another truly difficult procedure is the fusion of glass overlays to a glass object. The latter can only be done with any degree of accuracy by the most able gaffer (highly skilled blower) and lampworker.

Accordingly, it is the object of this invention to provide a method by which raised surface symmetrical patterns are formed in glass structures. More particularly, this invention is concerned with enabling a lampworker to produce a unique surface effect known as "Millicane" glass.

Beyond the foregoing this invention concerns as yet another of its objects the fabrication of interlocking glass objects capable of being assembled, fused and shaped using conventional techniques of glass forming craftsmanship.

STATEMENT OF THE INVENTION

In accordance with the foregoing objects as well as features which will become more readily apparent, this invention concerns the method of producing, as well as the products therefrom, cane glass and interlocking glass objects. Using as a core a relatively long metal cylinder, the craftsman assembles (parallel to the long axis of the cylinder) a plurality of elongated glass rods forming a "working tube". The rods are contiguous with one another and completely surround the core. The working tube is made from this assemblage when the free end of the rods are fused and a pontil (glass rod used to hold the molten glass) is fused to the mass. Next, the core is removed but, due to the fusing step the assembled glass rods maintain their generally cylindrical shape. At this point the fused rods are ready to be "lamp worked" and using for the most part conventional techniques interesting surface effects are created starting with this "tube". Importantly, the separate rods are fused together to create a unique surface pattern as they are blown, drawn or spun. The pattern varies, of course, as the glass is worked but the millicane effect is preserved throughout.

To fashion interlocking glass objects in accordance with another aspect of this invention repeat the steps described above by assembling the rods longudvinially about the core. However, not all the roads extend beyond the core to be fused at one time. Instead, depending on the pattern desired, alternate ones may be fused, for examples on their respective ends to one side and rods not joined in that molten fusion are themselves fused at the opposite side. A pontil or stem is then secured to the respective molten masses of each side and used (when sufficiently cooled) to withdraw the rods (pulling in opposite directions) from engagement with each other. Each group of rods (two groups are thus created) can be worked independently, and returned to the former engagement to fashion numerous patterns.

The foregoing objects and features will be better appreciated from reading the ensuing detailed description and considering the accompanying detail drawings which include FIG. 1 showing an example of Venetian glass craftsmanship and in particular depicting a glass base and stem having a cane-twist surface effect;

FIG. 2 depicting a plurality of glass rods assembled about a cyclindrical core in accordance with the inventive assembly devised to create millicane surface;

FIG. 3 showing a sectional view taken along section lines 3—3 of FIG. 2;

FIG. 4 showing typically how the rod assemblage can be drawn to a thinner cross sectional area; and FIGS. 5 & 6 together showing an exemplary way of producing interlocking glass sections.

DETAILED DESCRIPTION

Considering initially FIG. 1, it is appropriate to begin with the work of a great craftsman to describe a strikingly similar canetwist surface effect achieved by the Venetians. Quite simply as can be seen, the surface of base 10 and stem 11 have rows of adjacent elongated semi-cylindrical surfaces smoothly touching one another. The vessel in the figure was created in the sixteenth century and all probability the base and stem were created in molds — but no records exist today to tell us of the techniques actually used.

Millicane effects are similar to base and stem of the goblet in FIG. 1. Because of the method we employ there is greater uniformity and symmetry in the finished pieces. Also, the surface effect of millicane appears on both sides of the finished piece.

Let us consider in some depth the procedure we have invented to create millicane surface effect, importantly, for the lamp worker. Turning to FIGS. 2 & 3 ther we see assembled the essential structure. To begin with our object is to create what we call a working tube. To start with we have a cylindrical core 13 surrounded by a plurality of glass rods 14. Core 13 in our preferred embodiment is a hollow metal cylinder — but the only restriction is that the core (or solid cyclinder) be of heat resistant material. It is possible to use rectangular cores, for example. The outer diameter of core 13 is specially selected to coordinate with the diameter of rods 14 and to insure that rods 14 pack tightly together about as well as touch the surface of cyclinder 13. Touching fit (i.e. each rod in contact with adjacent rods) is essential to the lamp work so that uniform melting takes place as the piece is formed. Circular band 15 wrapped tightly about rods 14 insures a compact structure.

The total structure of FIG. 2 is ready for the preliminary melt-step which joins glass rods 14 together. To the right side of FIG. 2 there is depicted the resultant molten end 16 with pontil or stem 17 affixed in the conventional manner. Molten end 16 is formed with use of a gas torch (lamp) flame played onto the ends of rods 14. Care must be exercised at this stage to insure that all rods 14 are joined into molten end 16, otherwise the periphery of the surface will be irregular or unworkable. The torch (not shown) joins pontil 17, which is typically a glass rod, by melting a portion of pontil 17 with molten end 16.

When molten end 16 has cooled sufficiently and the rods 14 are secured to end 16, band 15 and core 13 are removed. This leaves rods 14 formed into a cyclindrical shape and touching one another. This is the working tube. The structure is now ready to be shaped using rather conventional techniques of lampworking.

The glass rods 14 which we have found most successful are pyrex rods of the borasilicate family. Soda-lime glass could also be used, but would present more difficulty in handling.

FIG. 4 is at once rather conventional but serves to assist in discussing the lampwork technique. Work begins at a sufficient distance from end 16 (gather) and the securement of pontil 17 to avoid loosening one of rods 14 or pontil 17. Conventionally, the lampworker rotates the glass object to impart uniform heat to the whole section. In the case of the present invention this action melts adjacent glass rods 14 tieing them together into a uniform contiguous body at the same time softening the section so that it can be shaped. As shown in FIG. 4, the worker works from right to left (not a limitation however) while steadily rotating rods 14 under the flame of lamp 18. In this figure the glass unit is being drawn to a reduced cross section.

To create, for example the base 10 of FIG. 1 the following procedure is followed. Assuming the rods have been assembled as discussed above and the core 13 has been removed, we proceed as follows. A section of the glass is heated. Then the center of the section is blown to expand it to a larger section and is cut into two parts. The open end of one section is heated, rotated, and flared with a wooden paddle until the desired shape of the base is achieved. If a slight twist is desired in the finished design then when the glass section is first heated the twist could be quite simply imparted.

FIGS. 5 and 6 offer an alternative form of the invention which stems from the procedures outlined previously to produce millicane effects. In this exemplary embodiment the initial assembly is approximately the same except that each second rod 21 is withdrawn and thereby joined in only the melted ends of the opposite end. This can be seen in FIG. 5 where rods 21 and rods 26 alternate with each other. Rods 21 are joined in molten end (gather 22 and, rods 26 are joined in molten end (gather) 23. Pontils 24 and 25 are joined to respective ends 22 and 23. This enables one to work one section (for example section 27 of FIG. 6) independently of the other section 28. After the sections are completed they can be joined (or interlocked) to the opposite section and fused if desired. The flexibility of this scheme permits of the most intricate of designs with ease.

The invention outlined herein may be varied by those skilled in the art without seriously departing from the spirit of this invention. For example, it is possible for one to replace the glass rods with hollow glass pipes and achieve a somewhat lacey effects in the raised semi-cylindrical surfaces of the completed product, a so called lacey millicane effect. Other similar changes are also considered possible, but are also thought to be within the scope of this invention.

What we claim are:

1. A method for fashioning glass objects with a lamp so as to produce millicane surface effects on interior and exterior surfaces of the finished objects utilizing glass rods and a disposable core and following the steps which comprise:
   assembling a sufficient number of said rods lengthwise touching one another and completely encircling said disposable core,
   fusing at one end of said assembled rods all of the free ends thereof in common to join the assembled rods into a rigid unitary structure sustained independently from said core,
   subjecting portions of the assembled rods to heat from said lamp uniformly applied to the outer surfaces of the assemblage of rods to cause adjacent touching portions of said rods to fuse together, and
   shaping said assemblage during said last step simultaneously to fashion glass objects having a contiguous millicane surface effect.

2. The invention of claim 1 wherein the glass rods are borosilicate rods.

3. The method described in claim 1 including the addition step of banding said assemblage rods prior to the fusing step to maintain the touching contact between each of said rods.

4. The method described in claim 1 wherein the disposable core is a shaping member for forming the unitary structure, and including an addition step following said fusing step of removing said member from the fused assemblage prior to the shaping step.

5. An article of manufacture produced in accordance with the method set forth in claim 1.

6. An article of manufacture produced in accordance with the method of claim 2.

7. A method for producing pairs of mating glass assemblies each of which may be fashioned independently by lampworking and thereafter rejoined comprising the steps of
   assembling a plurality of glass rods of substantially equal length adjacent longitudinally to one another upon a core,
   arranging said rods so that ends of one or more of said rods follow a preset pattern are withdrawn from engagement with ends of others of said rods,
   fusing the respective ends of said withdrawn rods to join the withdrawn ones of said rods in one unitary gather and joining the remaining rods into a separate unitary gather thereby forming mating pairs of rod assemblies, and
   withdrawing each such rod assembly from touching engagement with its mating assembly for lampwork fashioning.

8. The method described in claim 7 further including the step of reassembling mating rod assemblies so as to align the interlocking rods, and
   subjecting portions of the reassembled rods to heat to cause adjacent touching portions of said rods on each rod assembly to fuse together into a unitary structure.

9. An article of manufacture produced in accordance with the method of claim 7.

10. An article of manufacture produced in accordance with the method of claim 8.

* * * * *